Figure 4:
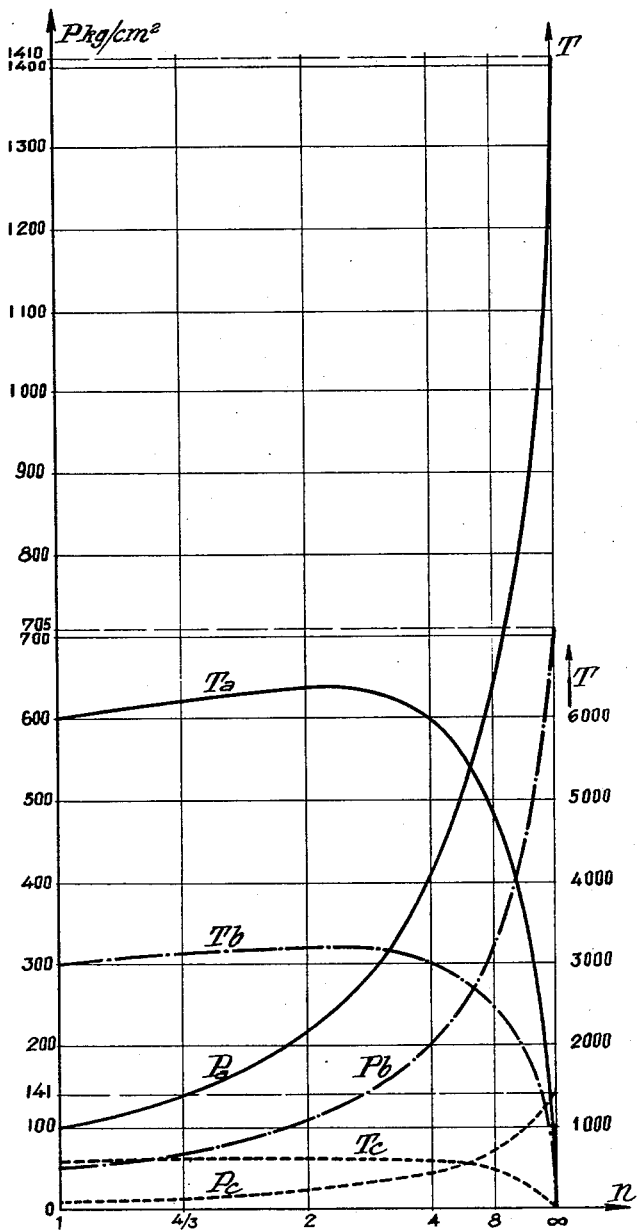

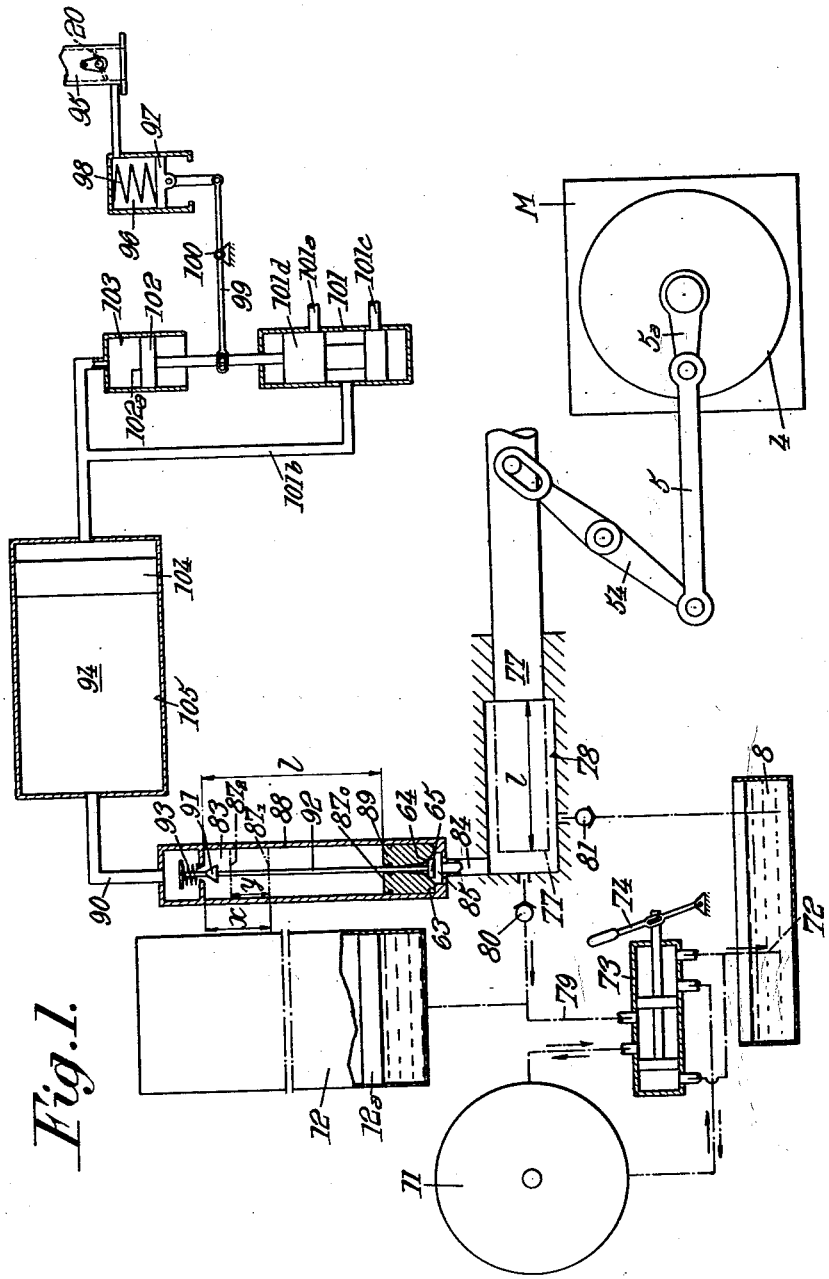

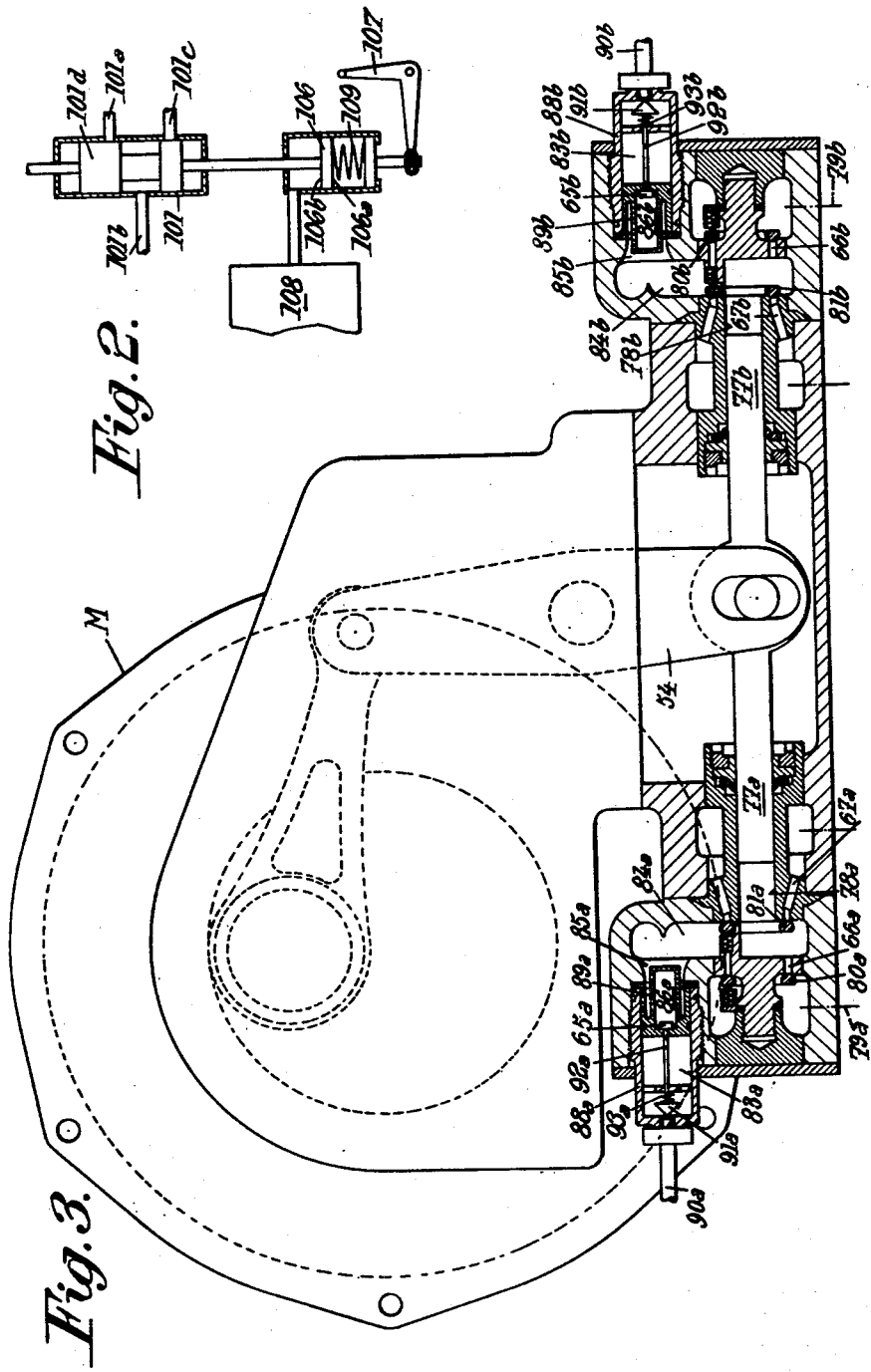

United States Patent Office 3,165,886
Patented Jan. 19, 1965

3,165,886
VARIABLE-RATIO HYDRAULIC TRANSMISSIONS, MORE PARTICULARLY FOR MOTOR VEHICLES
Paul Panhard, Paris, France, assignor to Société Anonyme des Anciens Etablissements Panhard & Levassor, Paris, France, a society of France
Filed Dec. 16, 1963, Ser. No. 331,068
Claims priority, application France, Dec. 15, 1962, 918,758
4 Claims. (Cl. 60—19)

This invention relates to variable-ratio hydraulic transmissions, more particularly for motor vehicles, comprising an engine which drives a reciprocating pump of constant swept volume supplying at least one driven machine which is usually a rotary hydraulic motor.

By "swept volume" is to be understood the product of the piston stroke relative to the cylinder times the internal cross-section of the cylinder. In most cases, the cylinder is stationary and the piston movable, so that a constant swept volume implies a constant piston stroke. In some cases, however, the cylinder is movable instead of the piston, but the relative axial motion between cylinder and piston must invariably be constant, and this relative axial motion is hereinafter designated by "$l$."

It is known that in all variable-ratio transmissions the demultiplication ratio (the ratio of the number of driving engine cycles in unit time to the number of driven machine cycles in that time) is given by $Kn$, where K is a fixed coefficient depending on the design of the transmission and $n$ a variable coefficient which can theoretically vary from unity to infinity in a transmission with continuously variable ratio, such variation ranging from the predetermined maximum speed of the driven machine to zero speed thereof for a given driving engine speed. Having regard for the power developed by the driving engine and the torque that must be developed by the driven machine, it will be seen that, neglecting frictional losses, the coefficient $n$ implies that the driving work is equal to the opposing work. It is known that in continuously variable-ratio transmission systems, $n$ should establish itself automatically at the desired value as a function of both the torque developed by the driving engine and the driven machine r.p.m.

This invention has for its object to provide such a hydraulic transmission that is reliable and of simple design.

A hydraulic transmission according to the invention is accordingly characterised by the fact that a hydropneumatic pressure accumulator is connected, upstream of a non-return valve, to the delivery conduit extending from the pump cylinder to the driven machine, and the system is so devised that said non-return valve opens only during the delivery stroke of the piston, when the pressure developed in the accumulator becomes equal to the counter-pressure prevailing downstream of the non-return valve and resulting from the resistance offered to the driven machine. This being so, the effective output from the pump to the driven machine will be equal to $$\frac{1}{n}$$

times the swept volume of the pump, at a pressure P equal to $n$ times the pressure $p$ corresponding to an effective output equal to the total swept volume.

The remaining $$\frac{n-1}{n}$$

of the swept volume is delivered into the pressure accumulator and, during the return stroke of the piston (suction stroke), the pump will admit only $$\frac{1}{n}$$

of its swept volume over and above the $$\frac{n-1}{n}$$

of the swept volume which is retrieved from the pressure accumulator.

The energy stored in the pressure accumulator is thus restored hydraulically to the engine, by the pump, during the return stroke of the piston.

The useful work furnished by the engine is given by $$T=P\times\frac{l}{n}=p.l$$

over a piston stroke equal to $$\frac{l}{n}$$

the work furnished by said engine during the remaining $$l-\frac{l}{n}$$

of the outward stroke being equal and opposite in sign to that restored to the pump by the accumulator over the same fraction of the subsequent return stroke of the pump piston.

The description which follows with reference to the accompanying non-limitative exemplary drawings will give a clear understanding of how the invention can be carried into practice.

Referring to the drawings filed herewith:
FIGURE 1 shows schematically in elevation, with fragmental sections, a hydraulic transmission system according to this invention;
FIGURE 2 is an alternative embodiment of a detail of FIGURE 1;
FIGURE 3 shows a preferred form of construction of the main components of FIGURE 1; and
FIGURE 4 shows a family of curves relating to operation of said transmission system.

Referring still to the drawings, FIGURE 1 schematically illustrates a variable-ratio closed-circuit hydraulic transmission comprising a driving engine, a pump with constant-stroke piston and at least one driven machine of constant unit output per cycle. Said pump is associated to a piston or plunger 77 (or preferably to two opposed pistons, whereby to reduce fatigue in the mechanism interposed between the engine M and the pistons) to which the engine M imparts a constant reciprocating stroke $l$ within a stationary cylinder 78. The engine M is a reciprocating engine having a flywheel 4, a crankshaft 5a and a connecting-rod 5 connected to piston 77 through a beam-lever 54. The cylinder 78 communicates with a driven machine or hydraulic motor 11, preferably of the rotary type, through a delivery conduit 79 and via a non-return valve 80, a regulating device 12 being mounted on said conduit 79 whereby to regulate the flow. Said regulating device 12 comprises a piston 12a, of which one face sustains the pressure being pulsed through the delivery conduit 79, and the other face an elastic force exerted for instance by a compressible gas such as nitrogen, or by a metal spring. An inlet valve 81 enables the assembly comprising piston 77 and cylinder 78 to draw liquid from a tank 8 to which the outlet end of driven machine 11 is connected through a line 72.

Through the medium of a line 84, cylinder 78 has unobstructed port in a pneumatic pressure accumulator forming a storage capacity 85. Said accumulator comprises a cylinder 88 having slidable therein a piston 89 which bounds a gas chamber 83 at the end of said cylinder remote from the storage capacity 85.

As will be explained hereinafter, for a given position of piston 89, the pressure prevailing in the chamber 83 is the factor which permits of adjusting that fraction $n$ of the swept volume of the pump which is effectively delivered through the valve 80.

Before pursuing the description of the installation shown in FIGURE 1, it is necessary at this stage to explain the operating principle thereof and the manner in which the volume of the chamber 83 should be determined as a function of said swept volume.

In what follows, the term "dead space" is to be taken as referring to the volume subsisting in the chamber 83 above 89 for zero flow through the valve 80, with the piston 77 at the end of its delivery stroke and therefore occupying the position shown in dot-dash lines in FIGURE 1, and the upper face 87 of piston 89 consequently occupying the position $87_2$ likewise shown in dot-dash lines.

For greater clarity in the description, it will be assumed first of all that compression and expansion of the gas (nitrogen, say) contained in the chamber 83 are isothermal. This being so, a zero dead space will be chosen, i.e., a maximum volume of chamber 83, equal to the swept volume of the pump. It will further be assumed that piston 89 has a diameter identical to that of piston 77, and consequently a same maximum stroke $l$ of, for example, 60 mm.

Regardless of the initial pressure in chamber 83 (namely the pressure prevailing when piston 89 is in its bottom dead center position shown in solid lines, with its upper face occupying position $87_0$), it will be demonstrated hereinafter, with the aid of numerical examples, that (a) It is always possible to obtain a flow through valve 80 at a pressure equal to the pressure in line 79 prevailing downstream of said valve, and (b) For a given initial pressure in chamber 83, the product (per stroke of piston 77) of the quantity of liquid delivered through valve 80 times the pressure in line 79 is constant, which means that the work done per piston stroke remains constant also.

This will be manifest if it be assumed that the initial pressure in chamber 83 is 100 kg./cm.² and that the pressure in the delivery line 79 is likewise 100 kg./cm.², in which case the 60 mm. stroke $l$ of piston 77 will be used in full. The work done will be equal, to within a multiplication constant, to $60 \times s \times 100 = 6000\ s$, where $s$ is the cross-section of piston 77.

If it now be assumed that the initial pressure in chamber 83 be still 100 kg./cm.² but that the pressure in the delivery line 79 is 200 kg./cm.², then, according to Boyle's Law (constant product of pressure times volume), the piston 89 must cover half its maximum stroke, i.e. 30 mm., for the pressure in chamber 83 to reach the same value as the pressure in delivery line 79, in other words before the liquid is allowed to flow through valve 80. From that point onwards piston 77 will deliver through valve 80 the remainder of the swept pump volume, i.e. $30\ s$, at a pressure of 200 kg./cm.², which equals an amount of work done equal to $30 \times s \times 200 = 6000\ s$ (assuming the same conventions as precedingly).

It it be further assumed that the initial pressure in chamber 83 is again 100 kg./cm.² but that the pressure in delivery line 79 is 600 kg./cm.², then Boyle's Law shows that the piston 89 must compress the nitrogen contained in chamber 83 to one-sixth of its initial volume. This leaves 10 mm. of useful stroke for the piston 77 to delivery fluid at a pressure of 600 kg./cm.², and the work done will be equal to $10 \times s \times 600 = 6000\ s$.

If it be finally assumed that the initial pressure in chamber 83 is only 10 kg./cm.² (instead of 100 kg./cm.² as in the three preceding examples), it will still be possible to obtain delivery at a pressure of 600 kg./cm.² through valve 80 after the piston 89 has compressed the nitrogen contained in chamber 83 to one-sixtieth of its initial volume. The piston 77 is then left with 1 mm. of useful stroke, and the work done will be equal to $1 \times s \times 600 = 600\ s$ (again assuming the same conventions as precedingly). The amount of work done here is thus one-tenth of that done in the previous examples, in which the initial pressure in chamber 83 was ten times higher.

From the foregoing it will be seen that the initial pressure prevailing in chamber 83 determines once and for all the work done per stroke of the piston 77, regardless of the delivery pressure, and that the pressure of the liquid delivered through the valve 80 always establishes itself automatically equal to that called for by the driven machine 11, without any form of intervention by the driver.

Subsidiarily, it is to be noted that the initial pressure in chamber 83 must be proportional to the torque developed by the engine M for a given position of the accelerator, following which everything adjusts automatically. It will be explained hereinafter how said initial pressure can be established automatically.

It should also be noted in passing that the elastic action of the gas contained in chamber 83 cannot be replaced by that provided by a metal spring, for it can be shown that in the latter case the work done would not remain equal when the pressure changes in the delivery line 79. Moreover, with a metal spring, it is for all practical purposes impossible to ensure satisfactory operation thereof when the initial load is variable in a ratio of one to ten.

In the foregoing it was assumed that the compression and expansion of the gas contained in chamber 83 were isothermal. In practice, however, it would be very difficult to achieve this condition, since it would be necessary to withdraw calories during compression and restore them during expansion. In contradistinction, an adiabatic, or approximately adiabatic, compression is easy to achieve and, provided that the starting data are chosen as indicated hereinafter, offers certain advantages such as the impossibility of exceeding a predetermined pressure.

With the demultiplication ratios normally usable on motor vehicles, which depend on the weight of the vehicle and its resistance to forward motion, it will suffice for the coefficient $n$ to be variable between 1 and 4 for normal speeds, since this will not only permit almost equal work done when the coefficient $n$ varies between 1 and 8, but will also limit in absolute fashion (for $n$ equal to infinity) the pressure or forces exerted to fourteen times the force corresponding to $n=1$.

If it be assumed as precedingly that $l=60$ mm., a condition can be set to the effect that, when the upper face of piston 89 is in the position $87_1$, in which the remaining stroke is $y=15$ mm. (or $n=4$), the pressure $p_1$ is equal to four times the initial pressure $p_0$ in the chamber 83. If $x$ be taken to designate the distance between the upper end closure of chamber 83 and the upper face of piston 89, then, assuming adiabatic conditions, $p_1 v_1^\gamma = p_0 v_0^\gamma$, with the conditions $p_0$ and $v_0$ corresponding to the position $87_0$ and the conditions $p_1$, $v_1$ to the position $87_1$. Since $p_1 = 4 p_0$, this gives (I)
$$\left(\frac{v_0}{v_1}\right)^\gamma = 4$$

with $\gamma$ equal to 1.33 approximately. But $v_0$ and $v_1$ are respectively proportional to the distance between $87_0$ and $87_1$ (i.e. 45 mm.) and to the distance $x$. From the relation (I) above can be deduced (II)
$$\left(\frac{45+x}{x}\right)^\gamma = 4$$

whence $x = 24.5$ mm. Hence the depth of the dead space (for the maximum stroke of piston 89) is $x - y = 9.5$ mm. and the total length of chamber 83 is 69.5 mm., or approximately $$\frac{7}{6} \cdot l$$

In other words, the volume of the chamber is approximately equal to seven-sixths of the swept volume of the pump.

For an initial pressure $p_0$ of 100 kg./cm.² in chamber 83, the table below gives, for different values of $n$, the maximum pressures P attained in the chamber 83 (i.e. the delivery pressure through valve 80), and the useful work done in each case by the pump (to within a proportionality coefficient):

| | | |
|---|---|---|
| $n=1$ | $P_a=p_0=100$ kg./cm.² | $T_a=6,000$ |
| $n=4/3$ | $P_a=138.2$ kg./cm.² | $T_a=6,217$ |
| $n=2$ | $P_a=212$ kg./cm.² | $T_a=6,360$ |
| $n=4$ | $P_a=400$ kg./cm.² | $T_a=6,000$ |
| $n=8$ | $P_a=650$ kg./cm.² | $T_a=4,880$ |
| $n_{\text{infinite}}$ | $P_{a_{\text{limit}}}=1,410$ kg./cm.² | $T_a=0$ |

The useful stroke of the pump piston 77 is equal to $l/n$ and the stroke of piston 89 to $$\frac{n-1}{n}l$$

It can be seen that the work done $T_a$ does indeed vary but little (between 6000 and 6360) as $n$ changes from 1 to 4, and that it does not vary significantly when $n$ reaches 8.

The curves representing the values $P_a$ and $T_a$ are drawn in solid lines in FIGURE 4. The curves $P_b$ and $T_b$, in dot-dash lines, and $P_c$ and $T_c$, in broken lines, correspond respectively to initial pressures of 50 kg./cm.² and 10 kg./cm.².

It is to be noted that the maximum pressure and the work done by the pump are proportional to the initial pressures. Thus, for an initial pressure of 10 kg./cm.², the maximum pressure is 141 kg./cm.², or roughly fourteen times the initial pressure.

In the foregoing, it was assumed that the normal range of utilisation of the system extended from $n=1$ to $n=4$. But if it now be assumed that the range extends from $n=1$ to $n=8$ for a same stroke $l=60$ mm., then the dead space hereinbefore defined must be equal to 6.45 mm. (instead of 9.5 mm.), giving the following figures for the pressures and the work done:

| | | |
|---|---|---|
| $n=1$ | $P=100$ kg./cm.² | $T=6,000$ |
| $n=2$ | $P=223$ kg./cm.² | $T=6,690$ |
| $n=4$ | $P=431$ kg./cm.² | $T=6,450$ |
| $n=8$ | $P=800$ kg./cm.² | $T=6,000$ |
| $n=12$ | $P=1,035$ kg/.cm.² | $T=5,175$ |

The limit pressure is equal to 22.3 times the initial pressure in the chamber 83. Broadly speaking, the volume of said chamber must be reduced when the maximum value of $n$ increases in normal use, and vice versa.

The form of embodiment shown in FIGURE 1 offers some very important advantages, for the adiabatic compression is very efficient and, on expanding, the gas trapped in the chamber 83 restores all the accumulated energy, since there is no loss of heat.

Since the limit pressure is equal to fourteen times the initial pressure (in the bottom dead centre position of piston 89), the maximum delivery pressure will vary between 140 and 1400 kg./cm.² if the limit pressure variations in chamber 83 are set between 10 and 100 kg./cm.². With the bottom pressure of 140 kg./cm.², it would suffice to lightly apply the handbrake of the vehicle fitted with the transmission system of this invention to prevent the vehicle from moving forward, thereby rendering superfluous any accessory devices such as a bypass or the like for use when the vehicle is halted.

It was stated precedingly that the initial pressure in the chamber 83 must be proportional to the torque developed by the engine M for a given position of the accelerator pedal. In the case of an explosive combustion engine, the pedal controls the butterfly-valve 20 which governs the gas flow through the inlet duct 95, whereas in the case of a progressive combustion engine it governs the flow of fuel admitted into the engine. In order to adjust said initial pressure, recourse is had to an automatic device which is dependent upon the load on the engine M and which adjusts said pressure each time the piston 89 reaches its bottom dead centre position, namely the position in which the chamber 83 reaches its maximum volume.

Reference to FIGURE 1 shows that chamber 83 is connected through a conduit 90 to a source for supplying pressure varying as a function of the engine load, which conduit is controlled by a valve 91 urged into the closed position by a spring 93. Between piston 89 and valve 91 is provided a lost-motion linkage consisting of a rod 92 rigidly connected to valve 91, and said piston 89 is freely slidable relative to said rod over the major part of its stroke. When piston 89 is close to the end of its stroke, which in the example shown is limited by the end closure 63 of cylinder 88, it entrains with it, through the agency of a protrusion 64, a flange 65 carried on the rod 92.

Considering now the aforementioned source of pressure varying as a function of the engine load, such pressure source is obtained by connecting the inlet duct 95 of engine M to a cylinder 96 within which is slidable a piston 97 spring-loaded by a spring 98. Piston 97 is pivotally connected to one end of a beam-lever 99 fulcrumed about a fixed point 100, the other end of said beam-lever being connected through suitable linkage means both to the slide-valve 101d of a distributor 101 and to a piston 102 cooperating with a cylinder 103. That face 102a of piston 102 which is remote from the corresponding end of beam-lever 99 is acted upon by a liquid under pressure which first reaches the distributor 101 through a conduit 101a, then the face 102a of piston 102 through a conduit 101b. The distributor 101 drains through a conduit 101c. The liquid under pressure conveyed through conduit 101b acts not only upon piston 102 but also upon a piston 104 adapted to be freely slidable in a cylinder 105 and to compress a gas enclosed in the chamber 94 which is bounded by said piston 104, thereby modifying the pressure in the conduit 90 connected to chamber 94, and hence also in the chamber 83.

If the piston 77 is at the beginning of its delivery stroke (as shown by the solid lines in FIGURE 1), the piston 89 will be in its lowermost position (shown in solid lines) within cylinder 88, in abutment against the end closure 63 thereof. The valve 91 will therefore be open and the pressure in chamber 83 will be equal to that prevailing in chamber 94. As it moves forward, piston 77 drives liquid under constantly increasing pressure into chamber 85, thereby causing piston 89 to rise and the gas trapped in chamber 83 to be compressed, since the valve 91 will have been closed by the initial forward motion of piston 77. When the pressure of said gas and hence also the pressure of the liquid in cylinder 78 have reached the value required to operate the driven machine 11, piston 89 stops rising and the remaining stroke of piston 77 causes the liquid to be flowed through the valve 80. The first fraction $$\frac{n-1}{n}$$

of the delivery stroke $l$ of piston 77 thus produces storage of the liquid under pressure in chamber 85, which chamber consequently fulfils the function of a hydro-pneumatic accumulator. During the first fraction $$\frac{n-1}{n}$$

of the subsequent suction stroke of piston 77, said accumulator returns the liquid under pressure it has stored during the delivery stroke, and it is only over the last fraction $$\frac{1}{n}$$

of the suction stroke that liquid is drawn from the tank 8, the quantity drawn in from tank 8 being equivalent to that which was effectively delivered to the driven machine 11 during the previous stroke. When piston 89 reaches the bottom of cylinder 78, valve 91 opens and the instantaneous pressure prevailing in chamber 94 is established once more in the chamber 83. Were the pressure established in chamber 83 to be low and the pressure required by the driven machine 11 high, the piston 89 would need to rise very high in cylinder 88 in response to the pressure of the liquid thrust forward by the pump piston 77 before the gas trapped in chamber 83 could reach a pressure high enough for delivery to take place. In this specific case, there is consequently a small flow of liquid at high pressure, which corresponds to a large demultiplication. If, conversely, the pressure established in chamber 83 is higher and the pressure required by the driven machine 11 low, then the piston 89 will rise comparatively little in cylinder 88 before equilibrium is attained, so that in this case there will be a large liquid delivery at lower pressure, which corresponds to a small demultiplication.

As already stated, the pressure prevailing in chamber 94 depends upon the engine load, for if engine M be running at idling speed, the depression in the inlet duct downstream of butterfly-valve 20 will be at a maximum. In FIGURE 1, the beam-lever 99 is shown as being horizontal.

When the vehicle is accelerated, the depression diminishes in duct 95 and the pressure exerted on the inner face of piston 97 increases, thereby causing the latter to be thrust downwardly and beam-lever 99 to tilt about its fulcrum 100 and to move piston 102 inwardly into cylinder 103. The slide-valve 101d of distributor 101 is moved in the same direction, resulting in fluid under pressure being admitted into the distributor through line 101a and being delivered against the pistons 102 and 104 through conduit 101b. The gas contained in chamber 94 is thus compressed progressively and, with each cycle of piston 77, the gas pressure in chamber 83 is a little higher and the liquid delivery past valve 80 a litter greater. The torque developed by engine M increases at the same time, however, thereby enabling it to deliver to driven machine 11 increasingly larger quantities of liquid, at a pressure which is provisionally still fairly high since the vehicle is in the process of accelerating. During this time, the liquid under pressure directed through distributor 101 tends to restore beam-lever 99 into the horizontal position by acting upon piston 102. Thus a state of equilibrium is progressively achieved, which is shattered only when the throttle control is moved back, thereby creating a depression in the inlet duct 95 and, by the reverse process to that explained hereinabove, causing beam-lever 99 to tilt in the opposite direction and thus drain the liquid under pressure through the line 101c and thereby relieve the pressure of the gas trapped in chamber 94.

In order to permit reversing the direction of travel of the vehicle by means of a reversible driven machine 11, provision could be made, irrespective of the form of embodiment adopted, for a distributor that enables the driver to cross-connect the connections leading to said machine from the pump and tank 8, respectively. Reference to FIGURE 1 shows that such a distributor is designated by numeral 73 and comprises control means 74, the directions of flow in the two-way flow conduits being represented by arrows drawn in solid lines and dot-dash lines, corresponding respectively to forward and reverse motion.

In order to permit regulating the liquid delivery in terms not only respective of the load but also of the rotational speed of engine M and thereby obtain still better operation, it will be of advantage to supplement the system shown in FIGURE 1 with the device illustrated in FIGURE 2, in accordance with which the slide-valve 101d is connected to a piston 106, one face 106a of which is subjected to a pressure exerted by the accelerator pedal 107, and the other face 106b to the force exerted by a liquid supplied by a source 108 and whose pressure is a function of the square of the engine speed. The accelerator pedal 107 acts upon piston 106 through the medium of a spring 109. The effects of this device are superimposed upon those provided by the system of FIGURE 1, for movement of accelerator pedal 107 tends to shift the distributor slide-valve 101d in the same direction as the reduced depression in the inlet duct 95 (see FIGURE 1) tends to do, and vice versa; the increasing engine speed tends to move slide-valve 101d of distributor 101 back into its orginial position, just as does also the liquid conveyed through line 101a, the pressure of which is exerted on piston 102.

It is preferable to associate, in pairs, cylinder-piston assemblies such as that designated by reference numerals 77, 78 in FIGURE 1. This leads to the highly advantageous form of construction shown in FIGURE 3, in which like numerals, followed by the letters a or b according as to whether they refer to the left-hand or right-hand cylinder-piston assembly of FIGURE 3, indicate like parts to those of FIGURE 1.

Reference to FIGURE 3 shows that the pistons 77a and 77b form an integral whole driven by the engine M through a rocking beam 54.

The conduits 90a and 90b are connected in parallel to chamber 94 of FIGURE 1. Considering the specific numerical example discussed hereinbefore, in which the initial pressure in chamber 83 is to vary from 10 to 100 kg./cm.$^2$, a capacity of approximately half a litre will suffice for chamber 94, and the system will be capable of transmitting approximately 60 horsepower.

The most distinguishing feature of the form of embodiment of FIGURE 3 resides in the design of the delivery valves 80a and 80b and/or the inlet valves 81a and 81b, which valves are constructed in annular form for cooperation with a plurality of orifices 66a, 66b and 67a, 67b, arranged in a ring. Such valves could be made of some suitable plastic such as nylon or of swaged sheet-metal. The advantage of this valve design resides essentially in that it permits maximum liquid delivery for minimum inertia.

Another feature of the embodiment of FIGURE 3 is that, instead of extending right through the associated piston via a convenient seal, as shown in FIGURE 1, the rods 92a and 92b extend into a sealed cavity 86a (or 86b) of the piston 89a (or 89b), which cavity is long enough to permit free motion of the projection 65a (or 65b) throughout that part of the stroke of these pistons wherefore valve 91a (or 91b) must remain closed. When this is the case, said cavities 86a and 86b form part of the gas chambers 83a and 83b.

In the foregoing it was assumed that the motor M was a rotary motor wherein energy could be stored by a flywheel, but it is to be understood that the invention can be applied at least as advantageously in the case of an engine comprising four pistons which are disposed in pairs in two cylinders in such manner as to bound two combustion chambers in all, said pistons being so associated and coordinated that one pair of pistons be simultaneously moving towards each other when the other pair are simultaneously moving away from each other, and vice versa. Each such engine piston is coupled mechanically to a piston pump such as those designated by reference numerals 77a and 77b in FIGURE 3.

In consequence whereof it will be clearly manifest that, irrespective of the form of embodiment hereinbefore disclosed, there is invariably obtained a variable-ratio hydraulic transmission system, the functional characteristics of which have been clearly disclosed in the foregoing description and which offer numerous advantages in comparison with prior art transmissions, to wit those of (a) Providing a mechanical design of minimum complication, wherein efficiencies remain good when the liquid delivery per cycle becomes very small, (b) Enabling the demultiplication to be adapted automatically to the speed of, or load placed on, the engine, or as a function of both of these variables at once, (c) Permitting driving facility, since the coefficient $n$ is established automatically as a function of road conditions, while the engine speed remains unchanged, and (d) Preventing a vehicle from running backwards on a hill when the system is set to operate for forward travel.

The basic advantage of using opposed pump pistons as shown in FIGURE 3 resides in the considerably increased efficiency, due to the fact that the work recovered from the left-hand cylinder directly assists the delivery stroke in the right-hand cylinder, and vice versa. Moreover, this is achieved without any mechanical linkages, which would automatically involve considerable loss when the useful stroke of the pump becomes very small and the delivery pressure very high.

While there have been shown and described the presently preferred embodiments of the variable-ratio hydraulic transmission system of this invention, it will be well understood by those skilled in the art that various changes and modifications may be made in these embodiments. It is, therefore, to be understood that the description hereinbefore set forth is not to be considered a limitation of the invention, but that changes may be made within the spirit and scope of the invention as set forth in the appended claims.

What is claimed is:

1. A variable-ratio hydraulic transmission, more particularly for motor vehicles, comprising a motor driving a reciprocating pump of constant swept volume said pump supplying at least one driven machine usually consisting of a rotary hydraulic motor, characterised in that a hydro-pneumatic pressure accumulator is connected, upstream of a non-return valve, to the delivery conduit connecting the pump cylinder to said driven machine, the whole being such that said non-return valve opens only during the delivery stroke of the pump piston when the pressure developed in said accumulator reaches the countering pressure prevailing downstream of said non-return valve as the result of the resistance offered to said driven machine, in consequence whereof the effective liquid delivery of the pump to the driven machine is equal to $1/n$ times its swept volume at a pressure P equal to $n$ times the pressure $p$ corresponding to an effective liquid delivery equal to the total swept volume, where $n$ is the ratio of the number of cycles accomplished in unit time by the driving engine to the numer of cycles accomplished in that time by the driven motor.

2. A hydraulic transmission according to claim 1, characterised in that the gas chamber of said hydro-pneumatic pressure accumulator has a capacity approximately equal to seven-sixths of the swept volume of the pump for a coefficient $n$ normally varying between 1 and 4, said capacity being reduced when the maximum value of $n$ increases beyond 4, and vice versa.

3. A hydraulic transmission according to claim 1, characterised in that it comprises means for establishing, in said hydro-pneumatic pressure accumulator gas chamber, an initial pressure proportional to the torque developed by the driving engine.

4. A hydraulic transmission according to claim 1, characterised in that its pump comprises two opposed units, each consisting of a piston and a cylinder, said units supplying the driven machine in parallel.

No references cited.

JULIUS E. WEST, *Primary Examiner.*